United States Patent

[11] 3,607,833

| [72] | Inventors | Ronald L. De Hoff<br>Maplewood, N.J.;<br>George D. Grieco, Ridgefield, Conn. |
|---|---|---|
| [21] | Appl. No. | 863,710 |
| [22] | Filed | Oct. 3, 1969 |
| [45] | Patented | Sept. 21, 1971 |
| [73] | Assignee | R. T. Vanderbilt Company, Inc.<br>New York, N.Y.<br>Continuation-in-part of application Ser. No. 767,846, Oct. 15, 1968, now abandoned. |

[54] PREPOLYMER OF EPOXY RESIN AND TRIS(HYDROXYMETHYL) AMINOMETHANE AND CURABLE COMPOSITION THEREOF
8 Claims, No Drawings

[52] U.S. Cl............................................. 260/47,
117/148, 117/155, 117/161, 260/830, 260/2,
260/33.4, 260/37, 260/348

[51] Int. Cl................................................. C08g 30/10
[50] Field of Search............................... 260/47 EP,
2 EP, 18 EP, 33.4 EP, 59, 830, 348

[56] References Cited
UNITED STATES PATENTS
3,449,281  6/1969  Sullivan et al. ............... 260/18 EP
OTHER REFERENCES
Handbook of Epoxy Resins Lee & Neville 7/1967 (pages 7-3, 7-20, 7-21, 13-10)

*Primary Examiner*—William H. Short
*Assistant Examiner*—T. Pertilla
*Attorney*—Brumbaugh, Graves, Donohue & Raymond

ABSTRACT: The specification relates to accelerating the cure of epoxy resins by incorporating a prepolymer of an epoxy resin with tris(hydroxymethyl) aminomethane. The specification also relates to alcohol solutions of this prepolymer for the preparation of paint films and the like.

PREPOLYMER OF EPOXY RESIN AND TRIS(HYDROXYMETHYL) AMINOMETHANE AND CURABLE COMPOSITION THEREOF

This application is a continuation-in-part of an application Ser. No. 767,846, filed Oct. 15, 1968, and now abandoned.

It is known to react epichlorohydrin or the like with a diphenol, bisphenol, glycerol or the like to form polymers well known in the art as epoxy resins [Polymer Processes, Schildkneckt, pages 429–474 (1956)]. A specific epoxy resin is the reaction product of epichlorohydrin and bisphenol-A, i.e., 2,2'-bis-(p-hydroxyphenyl)-propane, and this reaction product is believed to have the following structure:

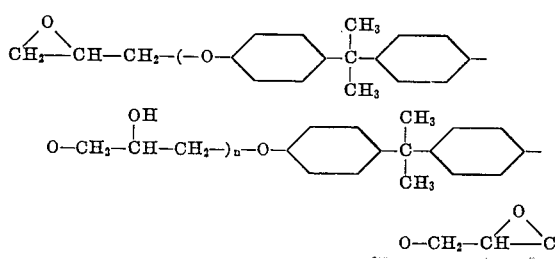

wherein $n$ is a recurring unit. This reaction product is frequently called the diglycidyl ether of bisphenol-A.

Epoxy resins cured in the presence of a cross-linking agent generally require 12 to 24 hours for the cure. It would be advantageous, therefore, to reduce the time to only a few hours, such as 1 to 5 hours.

Epoxy resins have numerous commercial uses. For instance, they may be applied in film form to paper, glass and wooden substrates as protective coatings, adhesives and sealants. Frequently, it is necessary to add reactive monoglycidyl ethers or semireactive epoxidized oils or nonreactive hydrocarbons to reduce the viscosity of the epoxy resins. However, the use of these materials may cause dermatitis problems, may create fire hazards, and may reduce the physical and chemical properties of the cured resins. Furthermore, expensive solvents, such as acetone and methyl ethyl ketone, may not be suitable since they tend to dissolve substrates, such as asphalt and vinyl tile. Epoxy resins of the bis-phenol type cured with the usual amine curing agents discolor when exposed to ultraviolet light. This shortcoming prevents their use as coatings on outdoor items.

It has now been discovered that these disadvantages can be overcome by employing a certain prepolymer. Thus, in accordance with one embodiment of this invention, the cure of an epoxy resin in the presence of cross-linking agents is accelerated by employing a prepolymer of an epoxy resin with tris(hydroxymethyl)aminomethane. In accordance with another embodiment of the invention, an alcohol of a lower alkyl, e.g., ethanol, can be used as a solvent for the aforementioned prepolymer. Coatings prepared with the prepolymers of the invention show greatly improved resistance to ultraviolet light.

In the present invention, a blend is prepared from about 5 to 14 parts (5 phr. to 14 phr.), e.g., 5 to 10 parts, of tris(hydroxymethyl)aminomethane and 100 parts of epoxy resin, e.g., diglycidyl ether of bisphenol-A. The epoxy resin can also be an aliphatic ether. Glycerin based epoxide resin, which is the epoxide resin formed from epichlorohydrin and glycerin (Epon 812 from Shell Chemical Company or Vanoxy 112 from R. T. Vanderbilt Company, Inc.), is an example of an aliphatic epoxide resin which forms an alcohol-soluble prepolymer, for instance, when 6 parts by weight of trisamino is heated with 100 parts by weight of glycerin epoxide in 100 parts by weight of ethanol and the prepolymer does not crystallize out when the reaction mixture is subsequently cooled or stored. Another example of aliphatic epoxide resin, which forms an alcohol-soluble prepolymer, is glycidyl ester Epon 871 or Vanoxy 171 which is a flexible or rubbery resin. When the aforementioned blend is heated at elevated temperatures, it reacts to form a prepolymer which can be held at elevated temperatures up to about 250° F. for up to about 8 hours or longer without gelation. The viscosity of the prepolymer resulting from this fusion method depends upon the proportion of the trisamino compound that is used since the prepolymer becomes more viscous with increasing concentrations of the amino compound. Another method for preparing the prepolymer is to reflux in ethanol or the like at a temperature of about 80° to 85° C. When a low viscosity is desired, this reflux method is preferred.

The prepolymer is mixed subsequently with a minor amount of one or more cross-linking agents or one of the catalytic agents normally used in curing epoxy resins. Any suitable cross-linking agent may be employed, such as a polymercaptan, a primary or secondary amine or polyamine, fatty acid polyamides, a saturated or unsaturated dicarboxylic acid or anhydride, and a polyhydroxy phenol. The polymercaptans include the aliphatic dimercaptans, e.g., pentamethylene dimercaptan, decamethylene dimercaptan and the like, and the polymeric polymercaptans, e.g., the reaction products of dihalides and sodium tetrasulfide which are dimercaptans containing terminal mercaptan groups. The amines include benzyl dimethylamine, p,p'-diaminodiphenyl methane, methyl piperazine, dimethyl piperazine, propylene diamine, diethylene triamine, tetraethylene pentamine, m-phenylene diamine, iminobispropylamine, triethylene tetramine and the like. The fatty acid polyamides include the reaction products of dimerized fatty acids with lower alkylene diamines and triamines, such as the product of linoleic dimer acid and diethylene triamine. The dicarboxylic acids include adipic, fumaric, maleic, malic, oxalic, sebacic, tartaric and the like, and the anhydrides include maleic, succinic, phthalic, tetrahydrophthalic and the like. The polyhydroxy phenols include resorcinol, catechol, hydroquinone, 4,4'-dihydroxy diphenyl sulfone, the alkyl bisphenols, such as 4,4'-dihydroxy diphenyl propane, and the A or B stage phenolaldehyde condensates. The catalytic agents normally used to cure epoxy resins include tertiary amines such as benzyl dimethylamine and tris(dimethylaminomethyl)phenol; Lewis acids, such as boron trifluoride and its adducts; and Lewis bases, such as imidazole and alkyl-substituted imidazoles and their adducts.

The process of the invention produces a series of prepolymers containing methylol groups in addition to epoxy groups which are curable by epoxy curing agents heretofore restricted to the curing of solid epoxy resins. Such curing agents include urea-formaldehyde condensation products, melamine-formaldehyde condensation products and phenol-formaldehyde products.

The epoxy resin may also contain minor amounts of optional ingredients such as reactive diluents, organic solvents, fillers and the like. By reactive diluents are meant those monoepoxides commonly introduced to change the properties of the cured resins derived from the diglycidyl ether of bisphenol-A. They include such monoepoxides as butyl glycidyl ether, phenyl glycidyl ether, cresyl glycidyl ether, allyl glycidyl ether and gamma-butyrolactone. Also included are such trade-named products as the epoxide derived from a long chain aliphatic alcohol and known as "Epoxide 7" of Procter & Gamble, and the epoxy ester of mixed aliphatic $C_9$–$C_{11}$ monocarboxylic acids consisting principally of acids having a tertiary carbon alpha to the carboxyl and known as "Cardura E" of Shell Chemical Company.

Organic solvents which may be used in one embodiment include lower aromatic hydrocarbons such as benzene, toluene and xylene; lower aliphatic and cycloaliphatic ketones such as acetone, methyl ethyl ketone, diisobutyl ketone, cyclohexanone and methylcyclohexanone; and aliphatic esters of lower monocarboxylic acids such as ethyl acetate, isopropyl acetate, butyl acetate and the like. These are nonreactive toward the glycidyl ether.

Fillers may also be used in conjunction with the epoxy resins. This includes the following among others: talc, silica, alumina and calcium carbonate.

The mixture of prepolymer, cross-linking agent and any other ingredients may be cured by any acceptable procedure to form the finished product. One procedure is to cure at elevated temperatures. However, air drying at ambient temperatures is also suitable. The time for curing varies and it is dependent upon the temperature and other conditions, such as humidity. For instance, at a temperature of about 90° to 150° C. the time may be about 1 to 5 hours.

Thus, in accordance with a first embodiment of the invention, using the prepolymer shortens the curing time for epoxy resins. Therefore, the epoxy resins can now be more widely employed in coating or in large scale operations where oven capacity is a limiting factor.

A second embodiment of this invention depends upon the alcohol solubility of the prepolymers of epoxy resin prepared with 5 to 14 phr. of tris(hydroxymethyl)aminomethane. Suitable alcohols are alkanols having 1–5 carbon atoms and containing no oxygen other than hydroxyl oxygen, e.g., ethanol and butanol. The alcohol may be added to the previously prepared prepolymer to produce solutions with the prepolymer content varying from about 1 percent to 99 percent, preferably about 10 percent to 80 percent. It is preferred, however, to prepare the prepolymer directly in the alcohol by the reflux method described above. The content of prepolymer can be subsequently increased by removing some of the alcohol or it can be decreased by adding more of the same alcohol or by adding a different alcohol.

Any of the aforementioned cross-linking agents and optional ingredients may be included in minor amounts in the alcohol solution of prepolymer. The curing conditions are generally the same as those described heretofore for the first embodiment.

Thus, in accordance with a second embodiment of the invention, $C_1$ to $C_5$ alkanols can be employed as solvents for a prepolymer of epoxy resin and about 5 phr. to 14 phr. of tris(hydroxymethyl)aminomethane. Therefore, it is no longer necessary to employ other solvents, such as ketones, which had certain disadvantages when used with epoxy resins for providing coatings and paint films. The use of an alcohol as a solvent for epoxy resins obviates the restrictions now applied in certain areas because the vapors given off during application and baking of epoxy resin films form noxious products when they undergo thermal and photocatalytic oxidation.

The following examples are submitted to illustrate but not to limit this invention. Unless otherwise indicated, all parts and percentages in the specification and claims are based upon weight.

EXAMPLE I

A prepolymer was prepared by mixing 200 grams of Vanoxy 126, a moderately highly purified diglycidyl ether of bisphenol-A (of R. T. Vanderbilt Company, Inc.), with 10 grams of tris(hydroxymethyl)aminomethane. The mixture was heated in a glass beaker with good agitation at about 160° C. After the solids were melted, the heating was discontinued and the mixture was allowed to cool to room temperature. A clear water-white, viscous liquid resulted. The calculated epoxide equivalent of the prepolymer was 229 grams and it contained 5 phr. of tris(hydroxymethyl)aminomethane.

The prepolymer prepared above was compared with untreated Vanoxy 126 by placing 50-gram portions of each in separate containers and blending each with Nadic Methyl Anhydride (methyl endomethylene tetrahydrophthalic anhydride, m.w. 266) and benzyl dimethylamine in amounts calculated to cure each resin. Each composition was poured into heat distortion bar molds and cured at 100°–110° C. in a circulating air oven for 5 hours. After cooling to room temperature, heat distortion temperatures of the cured resins were determined on duplicate bars according to ASTM D648–56 at 264 p.s.i. stress with the following results:

| Composition | A | B |
|---|---|---|
| Vanoxy 126, grams | 50 | |
| Vanoxy 126 tris amino 5 phr, grams | | 50 |
| Nadic Methyl Anhydride, grams | 45.0 | 37.5 |
| Benzyl dimethylamine, grams | 1.0 | 0.9 |
| Heat distortion temperature, °C. | 102 | 127 |

These results show that the presence of tris(hydroxymethyl)aminomethane at a level of 5 phr. gives increased cross-linking of the resin as shown by increase in heat distortion temperature.

EXAMPLE II

Separate 50-gram samples of the prepolymer prepared in example I and Vanoxy 126 were combined with 45 grams of Nadic Methyl Anhydride and 1 gram of benzyl dimethylamine. The mixtures were cured for 2 hours at 90° C. and then for 3 hours at 150° C. The following results were obtained:

| Composition | C | D |
|---|---|---|
| Vanoxy 126 grams | 50 | |
| Vanoxy 126 tris amino 5 phr., grams | | 50 |
| Nadic Methyl Anhydride, grams | 45 | 45 |
| Benzyl dimethylamine, grams | 1 | 1 |
| Gel time at 90° C., minutes | 16 | 33 |
| Heat distortion temperature, °C. | 132 | 152–153 |

This demonstrates that the presence of the trisamino compound raises the heat distortion temperature significantly.

EXAMPLE III

A prepolymer was prepared by mixing 10 grams of tris(hydroxymethyl)aminomethane with 200 grams of Vanoxy 126. The mixture was heated to about 160° C. to form a clear solution.

To determine the effect on the rate of cure, separate 100-gram portions of the prepolymer of Vanoxy 126 resin were blended with 90 phr. of Nadic Methyl Anhydride aNd 1.9 phr. of benzyl dimethylamine and immediately poured into preheated heat distortion bar molds and cured for varying lengths of time. The molds were preheated for 15 minutes and the cure was carried out in an oil bath maintained at 125°±1° C. throughout by efficient agitation to ensure rapid heating and constant temperature of cure.

Two bars of each resin were removed from the oil bath after 15, 30, 45, and 60 minutes, cooled to room temperature, then evaluated for heat distortion properties. The results of these tests are as follows:

| Composition | | A | B |
|---|---|---|---|
| Vanoxy 126 resin, grams | | 100 | |
| Vanoxy 126 tris amino 5 phr., grams | | | 100 |
| Nadic Methyl Anhydride, grams | | 90 | 90 |
| Benzyl dimethylamine, grams | | 1.9 | 1.9 |
| Heat distortion point, °C. | | | |
| After | 15 minutes cure at 125° C. | 43 | 80 |
| | 30 | 57 | 97 |
| | 45 | 67 | 107 |
| | 60 | 74 | 118 |

It has been shown in this example that the prepolymer cures much more rapidly than does the untreated diglycidyl ether of bisphenol-A as evidenced by high heat distortion temperatures at a given cure time.

EXAMPLE IV

The effect of a prepolymer on an amine cure was determined by blending separate 100-gram portions of the prepolymer prepared according to example I and Vanoxy 126 resin with p,p'-diaminodiphenyl methane curing agent (Tonox). After pouring into preheated heat distortion bar molds, curing in an oil bath at 125°±2° C. for varying lengths of time and cooling to room temperature, the heat distortion temperatures were determined. The following results were noted:

| Composition | A | B |
| --- | --- | --- |
| Vanoxy 126 grams | 100 | |
| Vanoxy 126 tris amino 5 phr., grams | | 100 |
| Tonox, grams | 28 | 24 |
| Gel time at 125° C., minutes | 18 | 6 |
| Heat distortion point, °C. | | |
| After 15 minutes at 125° C. | | 128 |
| 18 | 92 | |

According to this example, the presence of 5 phr. of the trisamino compound in a diglycidyl ether of bisphenol-A prepolymer accelerates a standard amine cure as well as decreasing gel time.

EXAMPLE V

Prepolymers were prepared by mixing into separate 1,000-gram portions of Vanoxy 126 heated to 160° C., 10, 30 and 50-gram portions of tris(hydroxymethyl)aminomethane. Each of the mixtures was stirred at 160° C. until all of the crystals of the trisamino compound has dissolved and each was then cooled. A control without the trisamino compound was also prepared. The weight per epoxide (WPE) of each prepolymer (and control) was calculated in order that stoichiometric amounts of the curing agent could be used.

To separate 100-gram portions of the prepolymers and control were added stoichiometric amounts of Nadic Methyl Anhydride and benzyl dimethylamine as indicated in table 1. After blending thoroughly, each was divided between two heat distortion bar molds. The bar thus prepared were cured for 1.5 hours at 90° C., then for 3 hours at 150° C. Heat distortion temperatures were determined and the results are indicated in table 1.

TABLE 1

| Composition | A | B | C | D |
| --- | --- | --- | --- | --- |
| Vanoxy 126, grams | 100 | 100 | 100 | 100 |
| Tris amino, phr. | 0 | 1 | 3 | 5 |
| WPE, grams | 185 | 189 | 200 | 229 |
| Nadic Methyl Anhydride, grams | 90 | 88 | 80 | 72 |
| Benzyl dimethylamine, grams | 1.80 | 1.80 | 1.80 | 1.80 |
| Heat distortion temperature, °C. | 132 | 141 | 143 | 155 |

It is evident that the presence of a prepolymer with 5 phr. of tris amino substantially increases the degree of cure of an epoxy resin.

EXAMPLE VI

The prepolymer was prepared by reacting at 150° C. 7.5 phr. of tris(hydroxymethyl)aminomethane with diglycidyl ether of bisphenol-A (Vanoxy 126). To the resulting prepolymer was added ethanol (Solox of U.S. Industrial Chemicals, 95 percent, denatured) to provide an alcohol solution, containing 80 percent prepolymer. This solution has the following characteristics:

| Viscosity at 25° C. | 750 cps. |
| --- | --- |
| Specific gravity | 1.09 |
| Color (Hellige) | 1 |
| Weight per epoxide (WPE) | 320 |

This solution was blended with 20 phr. of Curing Agent T-1 (adduct of propylene oxide, bisphenol-A and excess diethylenetriamine) and poured into an aluminum weighing dish. It set to a bubble free, water white coating in an hour at room temperature.

The alcohol solution was also blended with 50 phr. of polyamide resin curing agent having an amine value of 330–360 (Van-Amid 325) and a film drawn down on a Morest chart. A tack free time of 4 hours at ambient temperatures was attained and the film forming properties were excellent.

This example shows that a suitable casting and film can be obtained by using an alcohol solution of the prepolymer of this invention.

EXAMPLE VII

An alcohol solution of prepolymer was prepared by reacting 100 grams of Vanoxy 126 having WPE of 180–188, 7.5 grams of tris(hydroxymethyl)aminomethane and 26 grams of 95 percent ethanol (to provide 80 percent solids) in a kettle at 80–85° C. 100 grams of the resulting solution were blended with 31 grams of a polyamide resin having an amine value of 350–400. The gel time of the mixture was 44 minutes.

For comparative purposes, 100 grams of Vanoxy 126 having an epoxide equivalent of 180–188 were blended with the stoichiometric amount of the same polyamide resin, 81 grams. The gel time was about 5 hours.

EXAMPLE VIII

To 100 grams of the prepolymer prepared according to example VI and cut with 95 percent ethanol to contain 80 percent resin, were added 48.5 grams of a polyamide resin curing agent having an amine value of 330–360. Similarly, a 100 gram portion of conventional Vanoxy 126 cut to 80 percent resin with methyl ethyl ketone was blended with 67 grams of the same polyamide resin curing agent. Both mixtures were drawn down over cold rolled steel and the resulting films were compared after curing for 11 days at room temperature. The control (Vanoxy) film was characterized by a severe degree of tackiness and had a pencil hardness of HB, whereas the film prepared from the prepolymer was clear and tack free and had a pencil hardness of 3H.

The superiority of the invention is illustrated by examples VII and VIII.

EXAMPLE IX

The fusion method of example I was repeated to prepare a prepolymer. To 100 parts Vanoxy 126 resin were added 14 phr. tris(hydroxymethyl)aminomethane and the blend was melted together with stirring at 120° C. After the exotherm at 150° C. had subsided, the prepolymer thus formed was cooled to about 100° C. and Solox (95 percent ethanol) was added. Any alcohol lost by flashing was replaced and the solution was adjusted to 50 percent solids.

The 50 percent solution was placed in graduated cylinders and allowed to stand overnight at room temperature for ease in determination of any phase separation. Since there was no separation, the prepolymer was judged to be completely compatible for solubility in equal weight of alcohol which is defined herein as "medium range compatibility."

EXAMPLE X

The solution procedure described in example VII was used for direct preparation of prepolymers in alcohol solution. To separate portions of a mixture of equal weight of Vanoxy 126 resin and Solox was added tris(hydroxymethyl)aminomethane in an amount from 8 phr. to 14 phr. Each of the mixtures thus formed was heated at 65° to 80° C. for 1 or 2 hours, cooled, readjusted to 50 percent solids with additional Solox and observed for medium range compatibility as set forth in example IX. The results are as follows:

| Trisamino phr | Cooking temp. °C. | Time Hours | Medium Range Compatibility |
| --- | --- | --- | --- |
| 8.0 | 75 | 2 | Compatible |
| 10.0 | 75 | 2 | Compatible |
| 12.0 | 70–80 | 1 | Compatible |
| 14.0 | 70–80 | 1 | Compatible |

Examples IX and X show that prepolymers of the invention prepared by both fusion and solution methods are soluble in equal weights of alcohol and are, therefore, useful as coating resins.

Having set forth the general nature and specific embodiments of the present invention, the true scope is now particularly pointed out in the appended claims.

We claim:

1. A prepolymer which is a reaction product formed by the process consisting of heating at elevated temperatures from 100 parts of vicinal epoxy resin as a polyepoxide and 5 to 14 parts of tris(hydroxymethyl)aminomethane.

2. A curable composition consisting essentially of (1) a prepolymer which is a reaction product formed by the process consisting of heating at elevated temperatures from 100 parts of vicinal epoxy resin as a polyepoxide and 5 to 14 parts of tris(hydroxymethyl)aminomethane and (2) a curing agent for epoxy resin.

3. A curable composition consisting essentially of (1) a prepolymer which is a reaction product formed by the process consisting of heating at elevated temperatures from 100 parts of vicinal epoxy resin as a polyepoxide and 5 to 14 parts of tris(hydroxymethyl)aminomethane, (2) a $C_1$–$C_5$ alkanol and (3) a curing agent for epoxy resin.

4. The prepolymer to claim 1 in which the epoxy resin is diglycidyl ether of 2,2'bis-(p-hydroxyphenyl)-propane.

5. The composition according to claim 2 which also contains a reactive diluent for epoxy resin, a nonreactive organic solvent and a filler.

6. The composition according to claim 3 in which the alkanol is ethanol.

7. A process for accelerating the cure of epoxy resin which comprises forming by the process consisting of heating at elevated temperatures a prepolymer of 100 parts of vicinal epoxy resin as a polyepoxide and 5 to 14 parts of tris(hydroxymethyl)aminomethane and curing the prepolymer in the presence of a curing agent for epoxy resin.

8. A process for providing cured epoxy resin which comprises forming by the process consisting of heating at elevated temperatures a prepolymer of 100 parts of vicinal epoxy resin as a polyepoxide and 5 to 14 parts of tris(hydroxymethyl)aminomethane and curing the prepolymer in the presence of a curing agent for epoxy resin and a $C_1$–$C_5$ alkanol.